No. 745,009. PATENTED NOV. 24, 1903.
B. B. GILMORE.
VEHICLE AXLE AND WHEEL.
APPLICATION FILED AUG. 29, 1903.
NO MODEL.
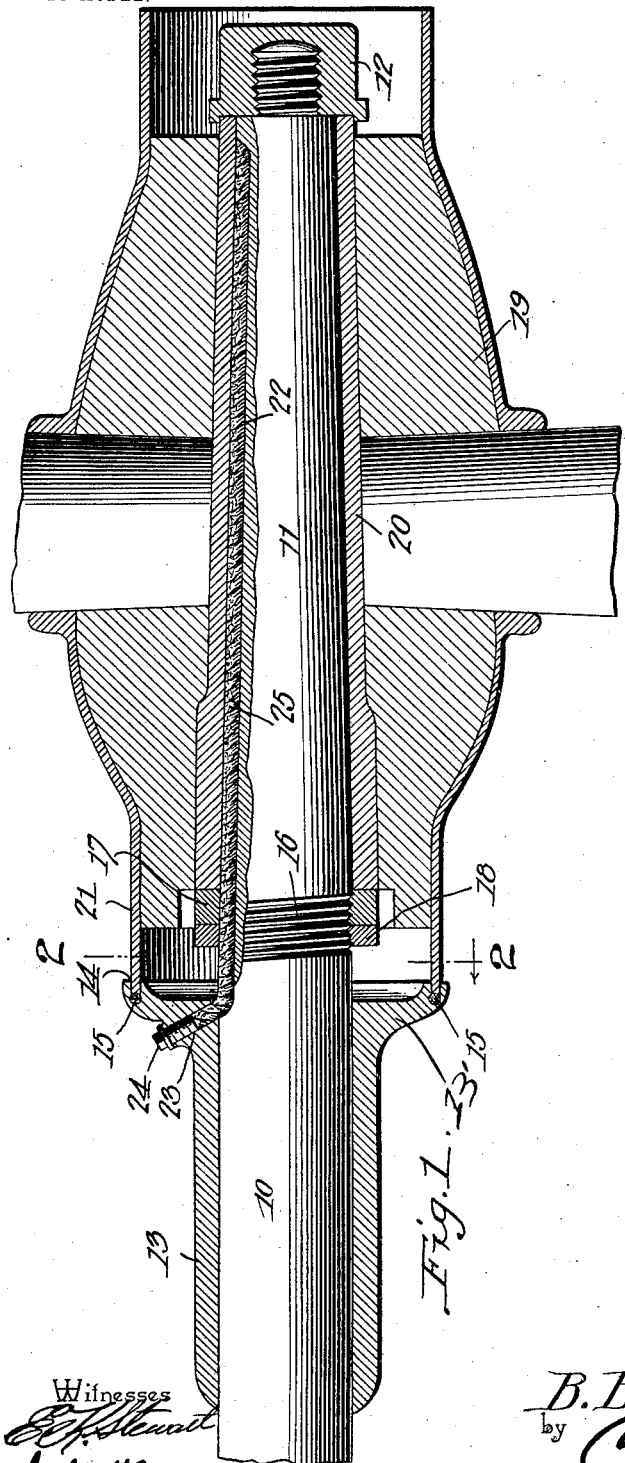
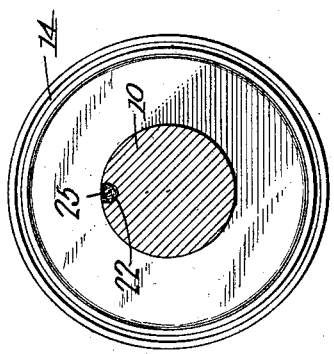

No. 745,009. Patented November 24, 1903.

UNITED STATES PATENT OFFICE.

BENJAMIN B. GILMORE, OF HOLMAN, INDIANA.

VEHICLE AXLE AND WHEEL.

SPECIFICATION forming part of Letters Patent No. 745,009, dated November 24, 1903.

Application filed August 29, 1903. Serial No. 171,258. (No model.)

*To all whom it may concern:*

Be it known that I, BENJAMIN B. GILMORE, a citizen of the United States, residing at Holman, in the county of Dearborn and State of Indiana, have invented a new and useful Vehicle Axle and Wheel, of which the following is a specification.

This invention relates to the construction of vehicle-axles and the hubs of the wheels, and has for its object to improve the construction, whereby the lubrication is more readily accomplished and the spindle protected from moisture, dust, and other foreign matter; and the invention consists in certain novel features of construction, as hereinafter shown and described, and specified in the claims.

In the drawings illustrative of the invention, in which corresponding parts are denoted by like designating characters, Figure 1 is a longitudinal sectional elevation of an axle-spindle and a portion of the adjacent axle and one of the hub portions of one of the wheels with the improvements applied. Fig. 2 is a transverse section on the line 2 2 of Fig. 1 with the hub removed.

The improved device may be attached to any form of vehicle axle and hub of the wheel, but for the purpose of illustration is shown applied to an ordinary form of buggy or carriage axle and hub, 10 representing a portion of the axle, 11 the spindle, and 12 the hub-holding nut, of the usual construction.

Attached to or formed integral with the axle 10 is a sleeve 13, having an outwardly-flaring enlarged head 13', provided with a flange having an annular recess 14, enlarged at its inner end to receive a yieldable packing 15, of felt, rubber, or other suitable material. This head 13' is preferably cup-shaped, with the recess formed in the edge thereof.

The axle is threaded between the spindle portion 11 and the head 13', as at 16, and engaging this threaded portion is an adjusting-nut 17, which may be supported, if required, by a jam-nut 18.

The wheel-hub is represented at 19 of the usual construction and provided with the skein 20, the latter operating against the nut 17, as shown. The casing of the hub or the "sand-band" portion 21 overhangs the skein 20 and the inner end of the hub and is adapted to rotate in the annular recess 14 and operate against the yieldable packing 15, as shown. By this arrangement it will be obvious that the longitudinal wear of the parts may be "taken up" and the position of the wheel completely controlled relative to the axle and its spindle, so that the friction in the groove 14 may be uniformly maintained against the packing, and thus prevent the ingress of moisture and dust or the egress of the lubricating material. All "rattling" caused by longitudinal looseness or unequal wear between the parts may thus be easily controlled and prevented.

Formed longitudinally in the spindle and also through the threaded portion 16 is a channel 22, the channel connecting with an aperture 23 in the flange 13, so that the lubricant inserted through the latter will be conducted to the skein 20, as will be obvious. The aperture 23 will be provided with a detachable plug or cap 24. The aperture 23 and channel 22 will preferably be provided with an absorbent filling 25, of sponge, felt, or other suitable material which will permit the lubricant to freely pass through, but which will not permit the oil to drip therefrom.

The whole device is very simple, readily applicable to any form of vehicle, and may be modified in minor particulars without departing from the principle of the invention or sacrificing any of its advantages.

Having thus described the invention, what I claim is—

1. An axle having lateral flanges in the rear of its spindles with annular recesses in their outer faces, and with a portion of the spindles threaded adjacent to said flanges, adjusting-nuts engaging said threads, the hubs of the wheels engaging said spindles and operating against said nuts and with their inner rims overhanging and rotatively engaging the recesses in said flanges, substantially as described.

2. An axle having sleeves encircling the ends thereof adjacent its spindles, said sleeves having cup-shaped heads each provided with an annular recess in the edge thereof, said recess being enlarged at its inner end to receive a yieldable packing, and wheel-hubs mounted on said spindles with their inner rims extending into said recesses and engaging said packing.

In testimony that I claim the foregoing as my own I have hereto affixed my signature in the presence of two witnesses.

BENJ. B. GILMORE.

Witnesses:
GEORGE E. GIVEN,
FRANK B. SHUTT.